United States Patent [19]

Balaban et al.

[11] Patent Number: 4,703,340

[45] Date of Patent: Oct. 27, 1987

[54] FREQUENCY DIVISION MULTIPLEXED ANALOG TO DIGITAL CONVERTER

[75] Inventors: Alvin R. Balaban, Lebanon; Leopold A. Harwood, Bridgewater; Chandrakant B. Patel, Hopewell; Walter H. Demmer, Plainsboro, all of N.J.

[73] Assignee: RCA Corporation, Princeton, N.J.

[21] Appl. No.: 858,720

[22] Filed: May 2, 1986

[51] Int. Cl.⁴ .............................................. H04N 5/00
[52] U.S. Cl. ...................................... 358/19; 358/37; 340/347 AD
[58] Field of Search ....................... 358/37, 38, 39, 23, 358/25, 17, 18, 19, 320; 340/347 AD; 307/510, 525

[56] References Cited

U.S. PATENT DOCUMENTS 4,562,456 12/1985 Bolger ........................ 340/347 AD Primary Examiner—Michael A. Masinick
Attorney, Agent, or Firm—E. M. Whitacre; P. J. Rasmussen; K. N. Nigon

[57] ABSTRACT

A digital television receiver, having a line locked clock, includes a first digital phase locked loop which regenerates quadrature phase related subcarrier signals that are used to synchronously demodulate the chrominance signal components of composite video signals into color information signals. When nonstandard video signals (e.g., from a video tape recorder) are processed by the receiver, frequency instabilities in the line locked clock signal may cause the color information signals to be distorted. To compensate for this distortion, a second phase locked loop is synchronized to a reference signal generated by an analog oscillator. The analog reference signal is linearly added to baseband analog video signals provided by a tuner. The combined signals are digitized by an analog-to-digital converter and then filtered by parallel low-pass and band-pass filters to develop digital signals representing the video signals and the reference signal, respectively. The digital reference signal is used to synchronize the second phase locked loop, the control signals of which are used to compensate the first phase locked loop for frequency instabilities in the clock signal.

7 Claims, 2 Drawing Figures

FREQUENCY DIVISION MULTIPLEXED ANALOG TO DIGITAL CONVERTER

The present invention relates to circuitry which uses only one analog-to-digital converter to convert a plurality of analog signals occupying mutually distinct frequency bands into respective digital signals.

Signal processing applications exist for which it is desirable to digitize two or more analog signals. Under certain conditions, this may be accomplished by circuitry which includes only one analog-to-digital converter (ADC). This circuitry has cost advantage over circuitry which uses a separate ADC for each of the signals. In one application of this type, described below, it is desirable to simultaneously digitize composite video signals and a sinusoidal reference signal having a frequency outside of the band of frequencies occupied by the composite video signals.

SUMMARY OF THE INVENTION

The present invention includes first and second terminals for applying respective first and second analog input signals occupying first and second mutually exclusive bands of frequencies. The first and second terminals are coupled to circuitry which linearly combines the first and second analog signals to develop a single composite analog signal. This composite signal is digitized by an ADC which has an input signal amplitude range that equals or exceeds to the amplitude range of the composite signals. The digital signal provided by the ADC is applied to filtering circuitry which develops first and second digital signals representing the respective first and second analog signals.

DETAILED DESCRIPTION

Figure 1:
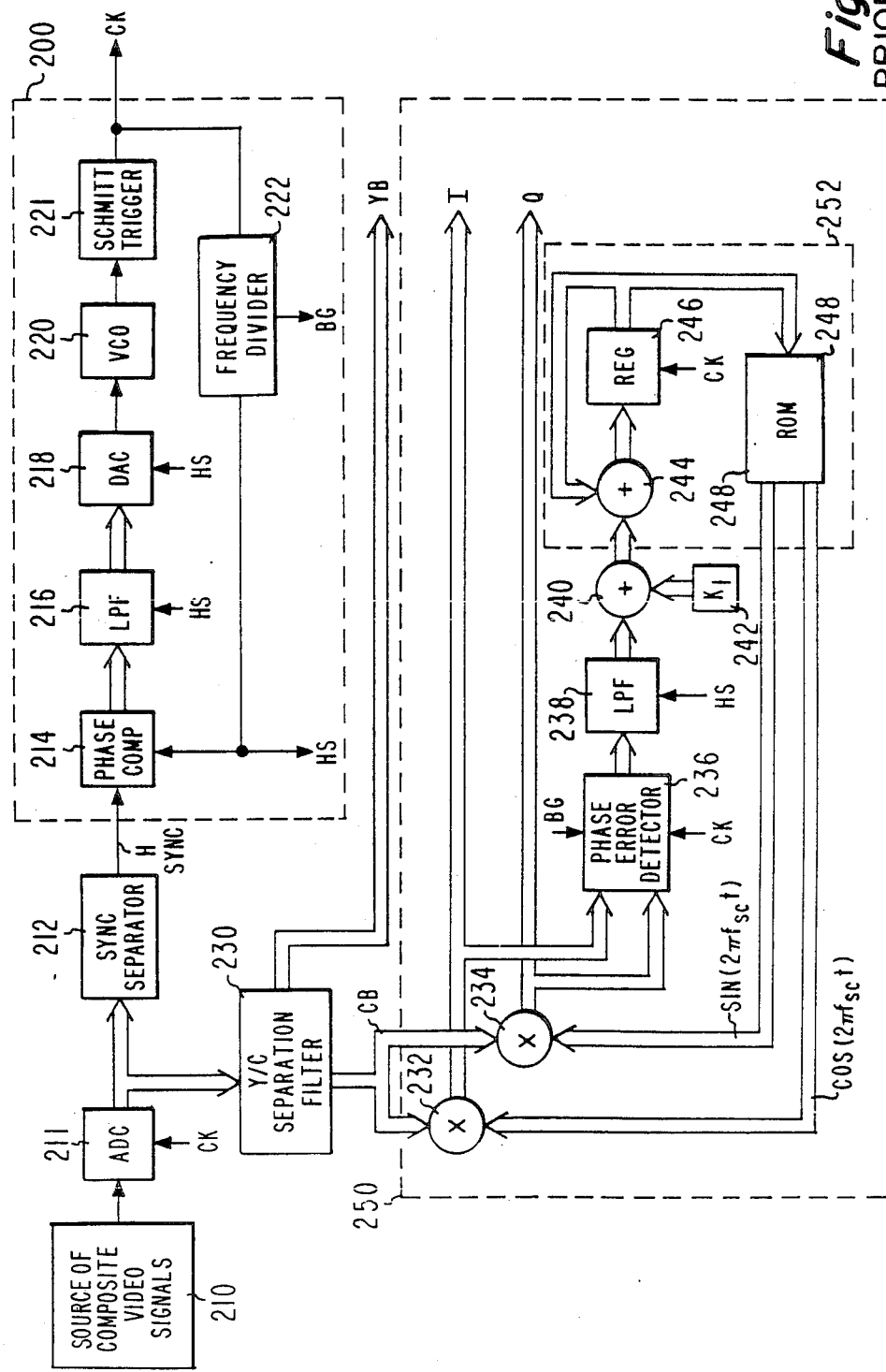
FIG. 1 (prior art) is a block diagram showing a portion of a digital television receiver.

In the drawings, broad arrows represent busses for multiple-bit parallel digital signals and line arrows represent connections carrying analog signals or single bit digital signals. Depending on the processing speed of the devices, compensating delays may be required in certain of the signal paths. One skilled in the art of digital circuit design would know where such delays would be needed in a particular system.

The embodiment of the invention described below is in the context of a digital television receiver. A portion of the television receiver, shown in FIG. 1, includes a phase locked loop (PLL) 200 which generates a clock signal, CK, that is locked in phase to the horizontal line synchronizing signal components of the received video signals (i.e. a line locked clock signal). A second PLL, 250, develops a regenerated subcarrier signal that is locked in phase to the color reference burst component of the received video signals. The regenerated subcarrier signal is used to synchronously demodulate the chrominance signal components of the video signals to develop two quadrature phase related color difference signals.

The line locked clock signal, CK, developed by the PLL 200 may exhibit frequency instabilities when the input video signals are derived from a nonstandard source such as a video tape recorder (VTR) or video disc player. The video signals provided by a nonstandard source generally have relatively stable color burst signal components but may have horizontal line synchronizing signal components which vary significantly in phase and/or frequency from line to line. These variations may be caused by video head misalignment or stretching of the tape in a VTR, defects in the disc or motor speed variations in either the VTR or the disc player. The frequency of the clock signal generated by the PLL 200 changes to track variations in the phase and/or frequency of the horizontal line synchronizing signal, and so, to keep the number of samples per line substantially constant throughout a field or frame. This feature is desirable in television signal processing systems which include field or frame store memories.

In the portion of the television receiver described below, however, this tracking feature may cause sufficient variation in the frequency of the clock signal to induce frequency instabilities in the regenerated subcarrier signal developed by the PLL 250 and so, to distort the recovered color difference signals.

To correct for these frequency instabilities in the regenerated subcarrier signal, the television receiver described below includes a third PLL, 300, shown in FIG. 2. The PLL 300 is a digital PLL which develops an oscillatory signal that is locked in phase to a reference signal provided by an analog crystal oscillator 310. Since the frequency of the reference signal is substantially invariant, the PLL 300 tracks frequency instabilities in its oscillatory signal that are induced by the clock signal, CK. The internal control signals developed by the PLL 300 which allow it to track these frequency instabilities are applied to the PLL 250 to stabilize the frequency of the regenerated subcarrier signal and, thus, reduce the amount of distortion in the recovered color difference signals.

For the system described above to significantly reduce the color signal distortion related to the clock signal instabilities it is desirable to use an analog crystal controlled oscillator to generate the reference signal for the PLL 300. This reference signal is substantially independent of the clock signal. The reference signal may be digitized either by a separate ADC or, as shown in the embodiment described below, by combining the reference signal with the analog composite video signals applied to the ADC 211 of the digital television receiver and then separating the digitized reference signal from the digital signals provided by the ADC 211. The digitized reference signal is applied to the phase comparator of the PLL 300.

Figure 2:
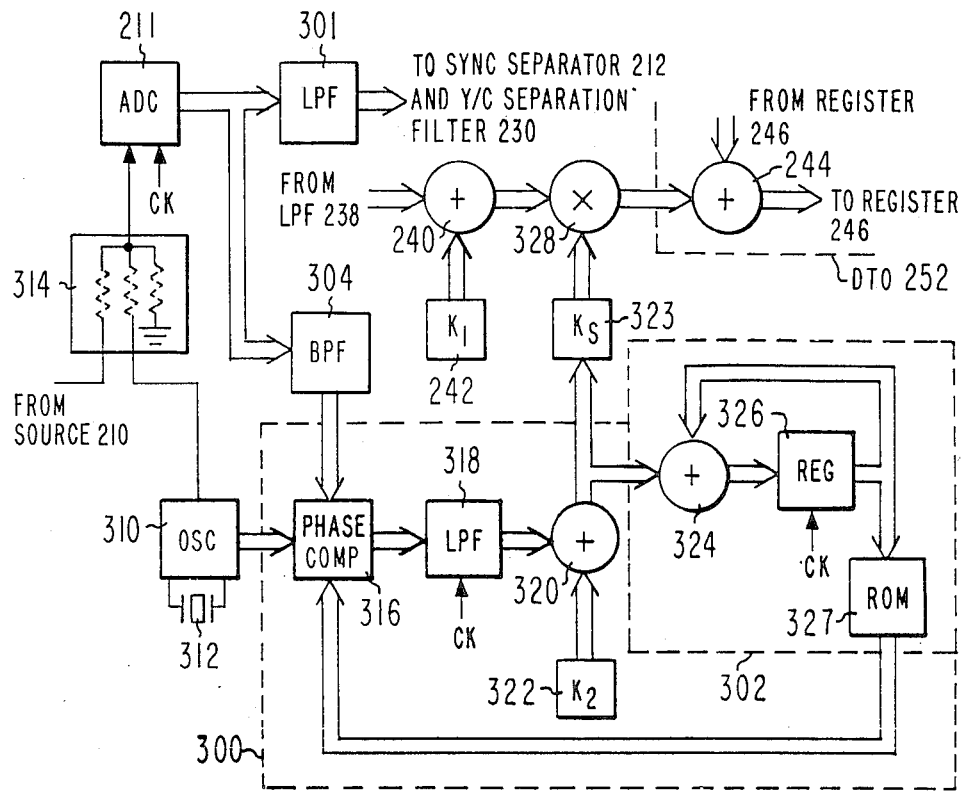
FIG. 2 is a block diagram of circuitry embodying the present invention which may be used with the circuitry shown in FIG. 1.

The operation of the embodiment of the invention in the portions of the television receiver shown in FIGS. 1 and 2 depends on the frequency of the clock signal, CK, the quantization resolution of the ADC, and the quantization resolution of the reference signal applied to the PLL 300. The following detailed description of the circuitry shown in FIGS. 1 and 2 is presented as an aid to understanding the importance of these parameters.

In FIG. 1, a source of composite video signals 210, which may, for example, include the tuner, IF amplifier and video detector of a conventional television receiver, provides composite video signals to the ADC 211. The ADC 211 is responsive to the sampling clock signal, CK, to provide digital samples representing the composite video signals. In a typical digital television receiver, the analog signal applied to the ADC is adjusted to occupy a range of amplitude values that is less than the range of values which may be converted by the ADC (i.e. the analog signal range of the ADC). For example, the present embodiment includes an eight-bit ADC which provides digital values ranging between 0 and 255. The dynamic range of the analog video signal applied to the ADC is limited to have a minimum value corresponding to the digital value 10 and a maximum value corresponding to the digital value 245. The unused quantization values at either end of the range of the ADC are used as buffer zones to detect positive and negative overflow conditions. In the present embodiment, therefore, the buffer zones define a dynamic range of 20 unused quantization levels.

Another attribute of the ADC that is important for the present invention is its sampling frequency. In the present embodiment the analog video signals are sampled at a frequency, $f_{ck}$, substantially equal to 910 times the horizontal line frequency $f_H$, or, for standard signals, four times the frequency of the color subcarrier signal, $f_{sc}$. Consequently, under the Nyquist criteria, analog signals having frequencies less than a threshold frequency of $455f_H$ (e.g. $2f_{sc}$ or 7.16 MHz for standard NTSC signals) may be digitized without introducing aliasing distortion. The highest frequency components of the analog video signals applied to the ADC are significantly below this threshold (e.g. 4.2 MHz for NTSC video signals).

The samples provided by the ADC 211 are applied to sync separator circuitry 212. The circuitry 212, for example, develops a signal, HSYNC, representing the horizontal line synchronizing signal component of the composite video signals. The signal HSYNC is applied to one input terminal of a phase comparator 214. An internally generated horizontal line synchronizing signal, HS, is applied to a second input terminal of the phase comparator 214. The circuitry which develops the signal HS is described below. Phase comparator 214 may, for example, be similar to the circuitry described in U.S. Pat. No. 4,506,175 entitled "Digital Phase Comparator Circuit Producing Sign And Magnitude Outputs" which is hereby incorporated by reference. The signal provided by the phase comparator 214 may be, for example, the time delay between the leading edges of the respective pulse signals HSYNC and HS. This signal has positive values when the leading edges of the HSYNC pulses occur before the leading edges of the HS pulses and negative values when the leading edges of the HSYNC pulses occur after the leading edges of the HS pulses.

The signal provided by the phase comparator circuitry 214 is applied to a low-pass filter 216. Filter 216 is the loop filter of the PLL 200. The filtered phase difference signals provided by the low-pass filter 216 are applied to a digital-to-analog converter (DAC) 218. DAC 218 develops analog potential values representing the filtered phase difference signals and applies these values at a horizontal line rate to a voltage controlled oscillator (VCO) 220. VCO 220 is tuned to have a free running frequency of R times $f_H$. In the present embodiment, R is the ordinal number of a harmonic of one-half the horizontal line frequency, $f_H$, which approximates a multiple of the color subcarrier frequency. For example, in the NTSC system, the frequency, $f_{SC}$, of the color subcarrier signal is the 455th harmonic of one-half of the horizontal line frequency, and, for standard signals, the frequency, $f_{ck}$, of the sampling clock signal is four times the frequency of the color subcarrier signal $4f_{SC}$. So the VCO used in this embodiment has a free-running frequency of approximately 910 times the horizontal line frequency (R=910).

The sinusoidal output signal of the VCO is applied to Schmitt trigger circuitry 221 which develops a square wave clock signal CK having a frequency, $f_{CK}$, equal to $Rf_H$. The signal CK is applied to frequency dividing circuitry 222. Circuitry 222 divides the frequency of the signal CK by R to develop a signal HS having a frequency substantially equal to $f_H$. As set forth above, the signal HS is applied to the second input terminal of the phase comparator 214.

The circuitry 222 may, for example, include a 10-bit counter (not shown) which is configured to be reset when a count value of 910 is achieved. The frequency dividing circuitry 222 may further include circuit elements (not shown) coupled to the counter to detect count values corresponding to the beginning and end of the burst interval and for generating a burst gate signal, BG, which spans the time interval defined by those count values in each horizontal line period.

The PLL 200 generates a clock signal, CK, which tracks the varying line frequency of a nonstandard signal to provide a substantially uniform number of sampling clock pulses per line. In the present embodiment, the gain factors of the phase comparator 214, low-pass filter 216, DAC 218, VCO 220, Schmitt trigger 221 and frequency divider circuitry 222 are selected to achieve a loop time constant of approximately 15 horizontal line periods and a damping factor of 2. These gain values depend on the circuit elements to be used in the PLL and may be readily calculated by one skilled in the art of phase-locked loop design. An explanation of the relationship between the gain values, the damping factor and the PLL time constant may be found in Gruen, W. J. "Theory of AFC Synchronization", Proceedings of the IRE, August 1953, pp. 1043–1048, which is hereby incorporated by reference.

Composite video signals from source 210 are also applied to Y/C separation filter circuitry 230. Circuitry 230 may include, for example, a low-pass filter and a band-pass filter for separating respective luminance and chrominance band signal components from the composite video signals. The luminance and chrominance band signals are available at the output busses YB and CB of the circuitry 230 respectively.

The separated chrominance band components are applied to multipliers 232 and 234 which, using signals provided by the PLL 250, demodulate the chrominance signals into two quadrature phase related baseband color difference signals, for example, I and Q. The color difference signals are applied to a phase error detector 236. The phase error detector 236 develops an output signal representing the difference between the phase of the demodulated color reference burst signal and a reference phase value. The phase error detector 236 may include, for example, circuitry (not shown) to separately accumulate baseband I and Q sample values during the burst interval and to divide the accumulated I values by the accumulated Q values to develop values representing the phase of the burst signal relative to the sampling instants of the I and Q samples. These values may be subtracted from a reference value representing the desired burst phase to generate phase error values to control the PLL 250. The phase error values developed by the detector 236 are applied to a low-pass filter 238. Filter 238 is the loop filter of the PLL 250. The filtered phase error signal provided by the filter 238 is applied to one input port of an adder 240. A fixed increment value, $K_1$, supplied by a source 242, is applied to the other input port of the adder 240. The signal developed by the adder 240 is applied as an input increment value to a discrete time oscillator (DTO) 252 which includes an adder 244, an accumulator register 246 and a ROM 248 that is programmed to provide, at respective first and second output ports, the cosine and sine of the accumulated increment values applied to its address input port, normalized to $2\pi$ radians. These signals, which in the present embodiment are the cosine and sine of $2\pi f_{sc}t$ respectively, are applied to the respective multipliers 232 and 234, as set forth above, to synchronously demodulate the chrominance signal to recover the two quadrature phase related color difference signals.

In the steady state, when there is no difference between the phase value of the demodulated burst signal and the reference phase value, the frequency of the signal developed by the DTO is determined by the number of bits, N, in the accumulator register 246, the increment value $K_1$ supplied by the source 242, and by the frequency, $f_{ck}$, of the clock signal CK according to the equation:

$$f_{DTO}=(K_1/2^N)f_{ck}$$

Assuming that the register 246 is a 20-bit register and that the frequency of the clock signal CK is equal to $4f_{SC}$, a value of $K_1$ equal to 262,144 (i.e. $2^{18}$) produces an output signal having a frequency of $f_{SC}$. In dynamic operation, when the burst phase does not match the reference phase, the phase error values provided by the detector 236 are accumulated by the low-pass filter 238 to develop a correction term which is added to the value $K_1$ by the adder 240 to change the frequency of the DTO in a sense that tends to reduce the phase error.

It is desirable for the time constant of the PLL 250 to be relatively long to reduce the effects of noise and to provide a high level of phase accuracy for the signals applied to the synchronous demodulating multipliers 232 and 234. In the present embodiment, for example, the gain factors of the various circuit elements in the PLL 250 are set to values which produce a loop time constant of approximately one frame period (1/30th of a second for NTSC signals). Since the time constant of the PLL 250 is much longer than the time constant of the PLL 200, the PLL 250 may not be able to track frequency changes in the regenerated subcarrier signal that are induced by changes in the frequency of the clock signal, CK. This deficiency in the system shown in FIG. 1 may cause random errors in the I and Q color difference signals or may cause the PLL 250 to generate a color subcarrier signal having the wrong frequency, locked to the wrong harmonic of the line frequency.

FIG. 2 is a block diagram of circuitry which compensates the PLL 250 for frequency variations in the clock signal CK and which embodies the present invention. The circuitry includes an oscillator 310 which develops a sinusoidal output signal occupying a range of amplitude values equivalent to 16 quantization levels of the ADC 211 (i.e. four bits) and a frequency, $f_{osc}$ determined by the resonant crystal 312. In the present embodiment $f_{osc}$ is substantially equal to $3f_{sc}/2$ (5.37 MHz) which is well above the highest frequency in the NTSC composite video signals (4.2 MHz). The output signal of the oscillator 310 is applied to analog summing circuitry 314 where it is added to the composite video signals provided by source 210. The summing circuitry 314, which may include, for example, a resistor network (shown in phantom) that linearly combines the composite video signals with the signals provided by the oscillator 310 to prevent heterodyning. It is contemplated that the summing circuitry 314 may scale the oscillatory and composite video signals prior to combining them. In this instance, the signals provided by the oscillator 310 may occupy a larger range of amplitude values than the 16 quantization levels set forth above. The combined signals developed by the summing circuitry 314 are applied to the ADC 211 in place of the composite video signals, as shown in FIG. 1. The digital signals provided, by the ADC 211 are applied to a low-pass filter 301 which has a frequency response characteristic that allows all frequency components of the digital composite video signals to pass with little or no attenuation but substantially blocks the components of the combined signal representing the output of the oscillator 310. The composite video signals developed by the low-pass filter 301 are applied to the sync separator circuitry 212 and Y/C separation filter 230 in place of the signals provided directly by the ADC 211 as shown in FIG. 1. The composite video signals applied to the ADC 211 are effectively dithered by the signal provided by the oscillator 310. Consequently, the composite video signals provided by the low-pass filter 302 may have a higher quantization resolution than composite video signals which are digitized directly as is shown in FIG. 1.

The digitized combined signals provided by the ADC 211 in FIG. 2 are also applied to a band-pass filter 304 which has a frequency response characteristic that substantially blocks the composite video signal components while passing the components representing the output signal of the oscillator 310. The oscillatory signals provided by the band-pass filter 304 are applied as the reference signal to the phase comparator 316 of the phase locked loop 300. In addition to the phase comparator 316, the PLL 300 includes a low-pass filter 318, adder 320, digital value source 322, and a DTO 302 which includes an adder 324, an accumulator register 326 and a ROM 327. This PLL develops, for example, a digital signal at the output port of the ROM 327 that has a quantization range approximately equal to the signal provided by the band-pass filter 304 and that is locked in frequency and phase to the signal developed by the oscillator 310. The phase detector 316 compares the signal provided by the ROM 327 to the reference signal provided by the band-pass filter 304. Once the PLL 300 has locked to the reference signal, the phase difference signal developed by the phase detector 316 represents phase changes in the signal developed by the DTO 302 that are induced by the clock signal. This phase difference signal is applied to a low-pass filter 318. Filter 318 is the loop filter of the PLL 300. The gain factors of the filter 318 are set, along with the gain factors of the other elements in the loop to provide a loop time constant that is less than or approximately equal to the time constant of the PLL 200 (i.e. fifteen horizontal line periods). The filtered phase difference signal provided by the filter 318 is added to a fixed digital value, $K_2$, from a source 322, by the adder 320. The signal provided by the adder 320 is applied as the input increment signal of the DTO 302. The output signal of the DTO 302 is applied to the phase detector 316 to complete the feedback loop.

The input increment signal developed by the adder 320 controls the frequency and phase of the signal provided by the DTO 302. This input increment signal includes a constant component, $K_2$, which holds the DTO 302 at the frequency of the reference signal, when standard video signals are being processed, and a variable component, supplied by the low-pass filter 318, which allows the DTO to track frequency instabilities in its output signal that may occur when nonstandard video signals are being processed. The input increment signal provided by adder 320 is applied to scaling circuitry 323, which multiplies the signal by a factor $K_S$ that is substantially equal to $1/K_2$. The output signal of the scaling circuitry 323 is applied to one input port of a multiplier 328, the other input port of which is coupled to receive the signal provided by the adder 240 of the PLL 250. The output signal of the multiplier 328 is applied as the input increment signal to the DTO 252. This modified input increment signal is compensated for changes in the frequency of the clock signal CK. Consequently, the PLL 250 tracks the color reference burst signal components of the composite video signals to regenerate quadrature phase related color subcarrier signals that are substantially independent of frequency instabilities in the line-locked clock signal.

It is important to note that, in the embodiment of the invention shown in FIG. 2, the sum of the ranges of amplitude values of the reference signal provided by the oscillator 310 and the composite video signals provided by source 210 is less than the range of signals which may be converted by the ADC 211 (i.e. $16+236=252$ which is less than 256). Furthermore, the frequency spectra of the reference and composite video signals do not overlap. Although the frequency of the reference signal used in this embodiment of the invention (5.37 MHz) is less than the Nyquist frequency of the ADC 211 (7.16 MHz), it is contemplated that a reference signal above the Nyquist limit may be used as long as its alias frequency is not within the band of frequencies occupied by the composite video signals. In this instance, the frequency of the reference signal applied to the PLL 300 is the alias frequency.

What is claimed is:

1. Apparatus comprising:
   first and second terminals for applying respective first and second input signals occupying respective first and second mutually exclusive predetermined bands of frequencies;
   circuitry coupled to said first and second terminals for linearly combining said first and second input signals;
   a source of clock signals;
   analog-to-digital converting means coupled to said combining means for developing digital samples representing the signals provided by said combining means at instants in time determined by said clock signal; and
   filtering means coupled to said analog to digital converting means and responsive to the digital samples provided thereby for developing first and second digital signals occupying mutually exclusive bands of frequencies and representing said first and second input signals, respectively.

2. The apparatus set forth in claim 1 wherein:
   said first and second input signals occupy respective first and second predetermined ranges of amplitude values;
   said combining means includes means for summing the amplitudes of said first and second input signals to develop an output signal which occupies a range of amplitude values proportional to the sum of said first and second predetermined ranges of amplitudes values; and
   said analog-to-digital converting means has an analog signal range that is not less than the range of amplitude values of the output signal of said combining means.

3. The apparatus set forth in claim 2 wherein said first input signal is a composite video signal and said second input signal is a sinusoidal oscillatory signal provided by a crystal controlled oscillator.

4. Apparatus comprising:
   a source of first analog signal occupying a predetermined band of frequencies and having a first predetermined range of amplitude values;
   an oscillator for generating a second analog signal having a predetermined frequency outside of said predetermined band of frequencies and having a second predetermined range of amplitude values;
   circuitry coupled to said source and to said oscillator for linearly combining said first and second analog signals to develop an output signal;
   a source of clock signals;
   analog-to-digital converting means coupled to said combining means for providing digital samples representing said output signal at instants in time determined by said clock signal; and
   signal filtering means coupled to said analog-to-digital converting means and responsive to the samples provided thereby for developing first and second digital signals representing said first and second analog signals respectively, wherein the frequency of said second digital signal is outside the band of frequencies occupied by said first digital signal.

5. In a television signal processing system, apparatus comprising:
   a source of composite video signals occupying a predetermined band of frequencies, having a first predetermined range of amplitude values and including a color reference burst signal component having a predetermined frequency;
   a source of oscillatory signals having a predetermined frequency not within said predetermined band of frequencies and having a second predetermined range of amplitude values;
   circuitry coupled to said source of composite video signals and to said source of oscillatory signals for scaling said composite video signals and said oscillatory signals by first and second predetermined values respectively and for linearly combining said scaled signals to develop an output signal;
   a source of clock signal having a frequency substantially equal to a predetermined integral multiple of the frequency of said color reference burst signal;
   an analog-to-digital converter coupled to said scaling and combining means for developing digital samples representing said output signal at instants in time determined by said clock signal; and
   filtering means coupled to said analog-to-digital converter and responsive to the samples provided thereby for developing first and second digital signals representing said composite video and oscillatory signals, respectively.

6. The apparatus set forth in claim 5 wherein the frequency of said oscillatory signal is substantially equal to one and one-half times the frequency of said color reference burst signal and the frequency of said clock signal is substantially equal to four times the frequency of said color reference burst signal.

7. A phase locked loop system, comprising:

a source of analog signals occupying a predetermined band of frequencies;

a source of analog reference signal having a predetermined frequency outside of said predetermined band of frequencies.

circuitry coupled to said source of analog signals for linearly combining the signals provided thereby with said analog reference signal to develop a combined signal;

a source of clock signals;

analog-to-digital converting means coupled to said combining means for providing digital samples representing said output signal at instants in time determined by said clock signal;

signal filtering means coupled to said analog-to-digital converting means and responsive to the samples provided thereby for developing a digital reference signal representing said analog reference signal to the relative exclusion of said analog signals;

a digital oscillator responsive to a control signal for providing a variable frequency digital oscillatory signal;

phase comparison means coupled to said digital oscillator and to said signal filtering means for developing a signal proportional to the difference in phase between said digital reference signal and said digital oscillatory signal and for applying said phase difference signal to said digital oscillator as said control signal.

* * * * *